(12) United States Patent
DeWitt, Jr. et al.

(10) Patent No.: US 7,313,734 B2
(45) Date of Patent: Dec. 25, 2007

(54) METHOD AND SYSTEM FOR INSTRUCTION TRACING WITH ENHANCED INTERRUPT AVOIDANCE

(75) Inventors: Jimmie Earl DeWitt, Jr., Georgetown, TX (US); Riaz Y. Hussain, Austin, TX (US); Frank Eliot Levine, Austin, TX (US); Robert John Urquhart, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 395 days.

(21) Appl. No.: 10/045,307

(22) Filed: Jan. 14, 2002

(65) Prior Publication Data

US 2003/0135789 A1    Jul. 17, 2003

(51) Int. Cl.
*G06F 11/00* (2006.01)
(52) U.S. Cl. .......................... 714/45; 714/38
(58) Field of Classification Search ............. 714/38, 714/45, 128; 712/244; 717/128
See application file for complete search history.

(56) References Cited

U.S. PATENT DOCUMENTS

| | | | |
|---|---|---|---|
| 3,707,725 A | 12/1972 | Dellheim | 444/1 |
| 4,598,364 A | 7/1986 | Gum et al. | 364/300 |
| 5,359,608 A | 10/1994 | Belz et al. | 371/16.5 |
| 5,446,876 A | 8/1995 | Levine et al. | 395/184.01 |
| 5,659,679 A | 8/1997 | Alpert et al. | 395/183.01 |
| 5,740,413 A | 4/1998 | Alpert et al. | 395/568 |
| 5,790,846 A | 8/1998 | Mealey et al. | 395/591 |
| 5,870,582 A | 2/1999 | Cheong et al. | 395/394 |
| 5,878,208 A * | 3/1999 | Levine et al. | 714/38 |
| 5,922,070 A | 7/1999 | Swoboda et al. | 712/244 |
| 5,938,778 A | 8/1999 | John, Jr. et al. | 714/45 |
| 5,970,246 A * | 10/1999 | Moughani et al. | 717/128 |
| 5,996,092 A | 11/1999 | Augsburg et al. | 714/38 |
| 6,026,503 A | 2/2000 | Gutgold et al. | 714/45 |

(Continued)

FOREIGN PATENT DOCUMENTS

EP    1039386 A1    9/2000

OTHER PUBLICATIONS

IBM Technical Disclosure Bulletin NN961231; Processor Single Step Trace Facility Enhancements; vol. 39; issue 12; pp. 31-32, published Dec. 1, 1996.*

(Continued)

*Primary Examiner*—Scott Baderman
*Assistant Examiner*—Joshua Lohn
(74) *Attorney, Agent, or Firm*—Duke W. Yee; Marilyn S. Dawkins; Theodore D. Fay, III

(57) ABSTRACT

A method, system, apparatus, and computer program product is presented for tracing operations. A set of related methodologies can be used within instruction tracing software, such as a tracing program, to reduce its tendency to generate interrupts that cause unwanted effects in the system that is being captured. A first methodology allows access to protected memory blocks so that instructions may be read from those memory blocks. A second methodology provides for the trace output buffer to be accessed using physical addressing. A third methodology traces only instruction addresses, which are resolved later during a post-processing phase of operation. A fourth methodology comprises multiple different methods for obtaining copies of instructions that have already executed rather than obtaining them before they are executed.

2 Claims, 9 Drawing Sheets

U.S. PATENT DOCUMENTS

| | | | | |
|---|---|---|---|---|
| 6,055,630 | A | | 4/2000 | D'Sa et al. ............... 712/240 |
| 6,094,729 | A | | 7/2000 | Mann ..................... 714/25 |
| 6,145,123 | A | | 11/2000 | Torrey et al. ............. 717/4 |
| 6,148,437 | A | | 11/2000 | Shah et al. ............... 717/4 |
| 6,507,921 | B1 | * | 1/2003 | Buser et al. .............. 714/45 |
| 6,728,906 | B1 | * | 4/2004 | Case et al. ............... 714/45 |
| 6,732,307 | B1 | * | 5/2004 | Edwards ................... 714/724 |
| 2002/0100023 | A1 | * | 7/2002 | Ueki et al. ............... 717/127 |
| 2003/0135789 | A1 | * | 7/2003 | DeWitt et al. ............. 714/38 |

OTHER PUBLICATIONS

Tanenbaum; Structured Computer Organization; 1990; Prentice-Hall, Inc.; Third Edition, pp. 11-13.*

*AIX Version 4.3 Kernel and Subsystems Technical Reference*, vol. 1, "plnu Kernel Service", IBM Corp., 1997.

*Itanlum™ Processor Microarchitecture Reference for Software Optimization*, Intel Corp., Mar. 2000, pp. 1-28.

*Itanium™ IA-64 Architecture Software Developer's Manual*, vol. 4: *Itanium™ Processor Programmer's Guide*, Revision 1.1, Intel Corp., Jul. 2000, pp. 6-1 to 6-32.

*Itanium™ IA-64 Architecture Software Developer's Manual*, vol. 1: *IA-64 Application Architecture*, Revision 1.1, Intel Corp., Jul. 2000, pp. 2-1 to 2-8, 3-1 to 3-20, 4-1 to 4-35, 9-1 t 9-16, 10-1 to 10-16.

*Itanium™ IA-64 Architecture Software Developer's Manual*, vol. 2: *IA-64 System Architecture*, Revision 1.1, Intel Corp., Jul. 2000, pp. 2-1 to 2-4, 3-1 to 3-22, 5-1 to 5-36, 7-1 to 7-14.

* cited by examiner

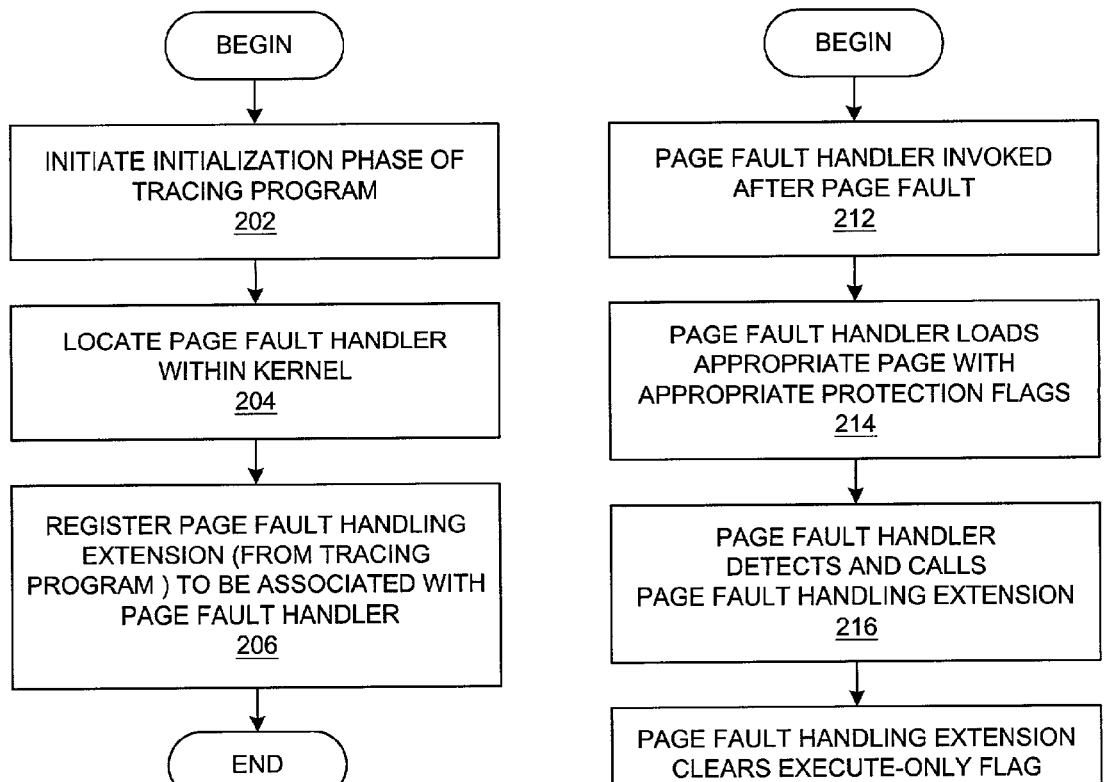
FIG. 2A
FIG. 2B
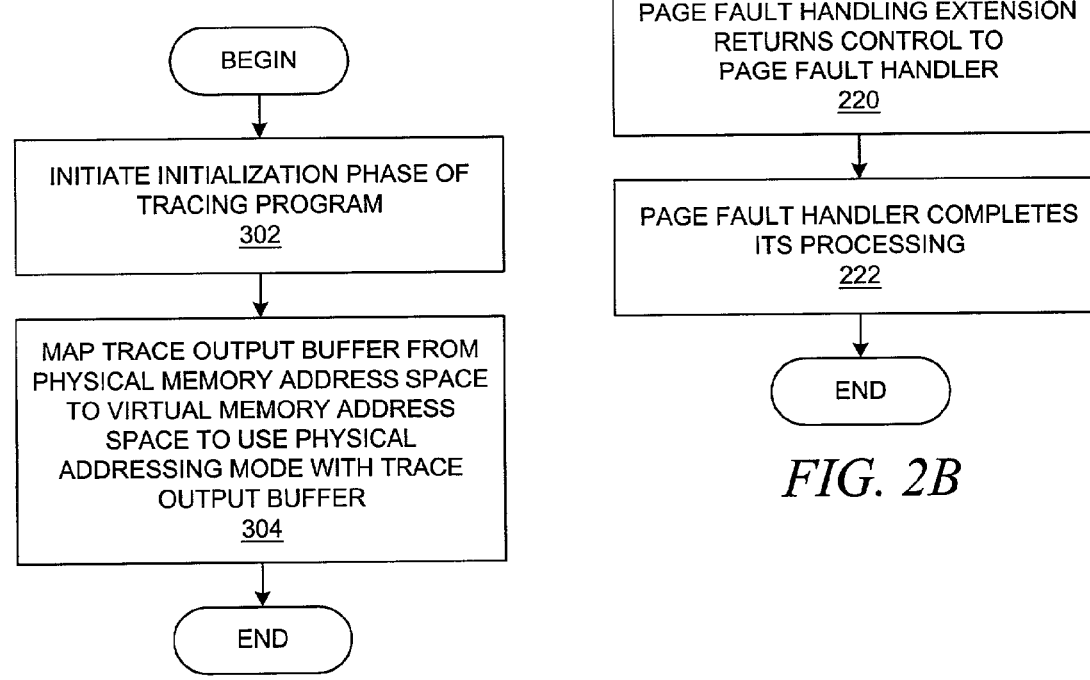
FIG. 3

METHOD AND SYSTEM FOR INSTRUCTION TRACING WITH ENHANCED INTERRUPT AVOIDANCE

BACKGROUND OF THE INVENTION

1. Field of the Invention

The present invention relates to an improved data processing system and, in particular, to a method and apparatus for optimizing performance in a data processing system. Still more particularly, the present invention provides a method and apparatus for a software program development tool for improving a software program with a program code execution analyzer, debugger, or monitor.

2. Description of Related Art

In analyzing the performance of a data processing system and/or the applications executing within the data processing system, it is helpful to understand the execution flows and the use of system resources. Performance tools are used to monitor and examine a data processing system to determine resource consumption as various software applications are executing within the data processing system. For example, a performance tool may identify the most frequently executed modules and instructions in a data processing system, or it may identify those modules which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. For example, a trace tool may log every entry into, and every exit from, a module, subroutine, method, function, or system component. Alternately, a trace tool may log the amounts of memory allocated for each memory allocation request and the identity of the requesting thread. Typically, a time-stamped record is produced for each such event. Corresponding pairs of records similar to entry-exit records also are used to trace execution of arbitrary code segments, starting and completing I/O or data transmission, and for many other events of interest.

In order to improve software performance, it is often necessary to determine where time is being spent by the processor in executing code, such efforts being commonly known in the computer processing arts as locating "hot spots." Within these hot spots, there may be lines of code that are frequently executed. When there is a point in the code where one of two or more branches may be taken, it is useful to know which branch is the mainline path, or the branch most frequently taken, and which branch or branches are the exception branches. Grouping the instructions in the mainline branches of the module closely together also increases the likelihood of cache hits because the mainline code is the code that will most likely be loaded into the instruction cache.

Ideally, one would like to isolate such hot spots at the instruction level and/or source line level in order to focus attention on areas which might benefit most from improvements to the code. For example, isolating such hot spots to the instruction level permits a compiler developer to find significant areas of suboptimal code generation. Another potential use of instruction level detail is to provide guidance to CPU developers in order to find characteristic instruction sequences that should be optimized on a given type of processor.

Another analytical methodology is instruction tracing by which an attempt is made to log every executed instruction. Instruction tracing is an important analytical tool for discovering the lowest level of behavior of a portion of software.

However, implementing an instruction tracing methodology is a difficult task to perform reliably because the tracing program itself causes some interrupts to occur. If the tracing program is monitoring interrupts and generating trace output records for those interrupts, then the tracing program may log interrupts that it has caused through its own operations. In that case, it would be more difficult for a system analyst to interpret the trace output during a post-processing phase because the information for the interrupts caused by the tracing program must first be recognized and then must be filtered or ignored when recognized.

More specifically, instruction tracing may cause interrupts while trying to record trace information because the act of accessing an instruction may cause interrupts, thereby causing unwanted effects at the time of the interrupt and generating unwanted trace output information. A prior art instruction tracing technique records information about the next instruction that is about to be executed. In order to merely log the instruction before it is executed, several interrupts can be generated with older processor architectures, such as the X86 family, while simply trying to access the instruction before it is executed. For example, an instruction cache miss may be generated because the instruction has not yet been fetched into the instruction cache, and if the instruction straddles a cache line boundary, another instruction cache miss would be generated. Similarly, there could be one or two data cache misses for the instruction's operands, each of which could also trigger a page fault.

In order to accurately reflect the system flow, the tracing software must not trace its own instructions or the effects of its execution. However, if the tracing software generates interrupts, exceptions, etc., it may be difficult to determine whether the interrupts would occur normally by the software without tracing or if the interrupt is only caused by the act of tracing. For example, if the tracing code is also tracing data accesses, which have not yet occurred, any page faults associated with the access of the data would be generated not only by the act of tracing but also would have occurred when the instruction itself was executed. In this case, if the tracing software suppresses tracing of the exception, the information regarding the exception would be lost. If the tracing software is attempting to copy an instruction that has not yet been executed, interrupts associated with the act of copying should not be recorded. If the tracing software reads the actual instruction and the instruction passes a page boundary, then normal execution path would cause a page fault, which should be recorded. If the tracing software reads more bytes than is required to execute the instruction and the read operation passes a page boundary, then the normal execution path may or may not pass a page boundary.

Therefore, it would be advantageous to provide instruction tracing methodologies with an enhanced ability to avoid generating interrupts in order to minimize some of the effects that are caused during tracing operations.

SUMMARY OF THE INVENTION

A method, a system, an apparatus, and a computer program product are presented for tracing operations. A set of related methodologies can be used within instruction tracing software, such as a tracing program, to reduce its tendency to generate interrupts that cause unwanted effects in the system that is being captured, including the generation of unwanted trace output information. In one methodology, the present invention recognizes that some memory blocks may be protected from access, thereby preventing read operations to obtain copies of instructions; the present invention presents a solution to obtain access to these memory blocks. In second methodology, the present invention recognizes that write operations for tracing instructions to the trace output buffer may cause interrupts; the present invention presents a solution in which the trace output buffer is accessed using physical addressing. In a third methodology, the present invention recognizes that retrieving a copy of an instruction may cause unwanted interrupts; the present invention presents a methodology in which only the instruction address is traced, and the instruction address is resolved later during a post-processing phase of operation. In a fourth methodology, the present invention recognizes that an instruction can be traced after it has executed rather than before; the present invention present multiple different methods for obtaining instructions that have already executed.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIGS. 2A-2B depict a methodology for reducing the tendency of instruction tracing software to generate interrupts during the operation of retrieving an instruction;

FIG. 3 depicts a methodology for reducing the tendency of instruction tracing software to generate interrupts during the operation of recording an instruction;

DETAILED DESCRIPTION OF THE INVENTION

The present invention is directed to a set of related methodologies to be used within instruction tracing software, such as a tracing program, to reduce its tendency to generate interrupts that cause unwanted effects in the system and that generate unwanted trace output information. As background, a typical organization of hardware and software components within a data processing system is described prior to describing the present invention in more detail.

Figure 1A:
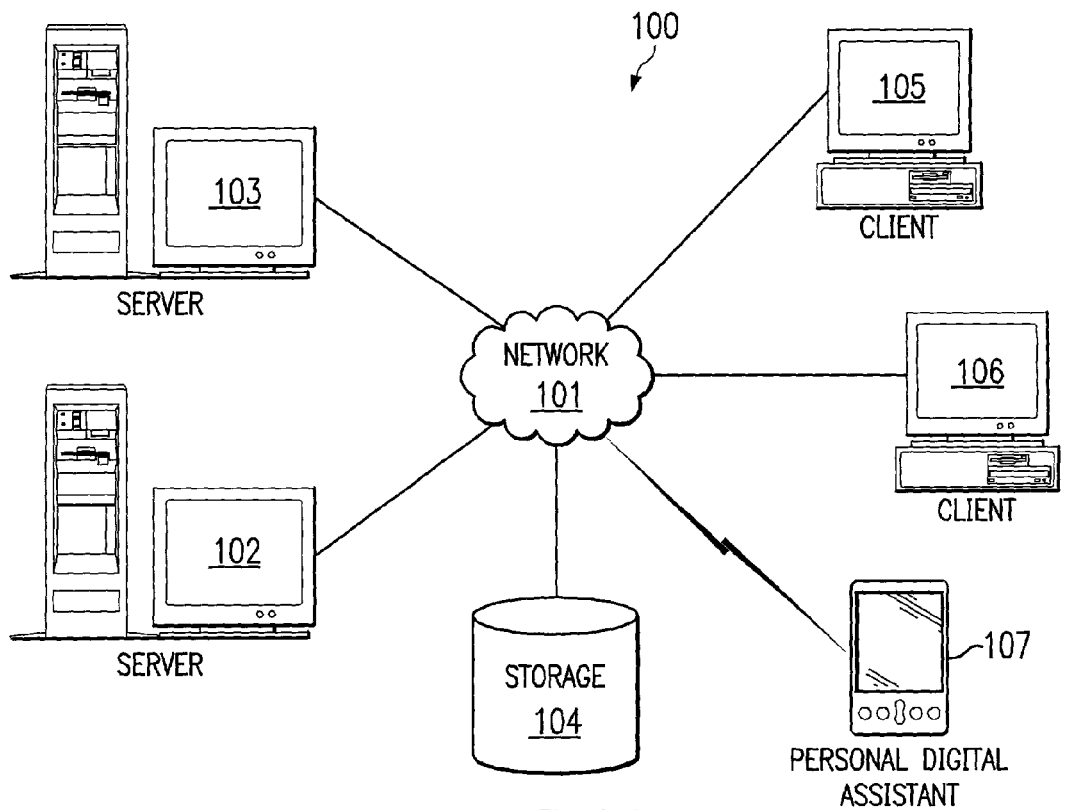
FIG. 1A depicts a typical data processing system in which the present invention may be implemented.

With reference now to the figures, FIG. 1A depicts a typical data processing system in which the present invention may be implemented. Data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 may be a variety of computing devices, such as personal computers, personal digital assistants (PDAs), etc. Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also be configured to include a number of different types of networks, such as, for example, an intranet, a local area network (LAN), or a wide area network (WAN).

FIG. 1A is intended as an example of a heterogeneous computing environment and not as an architectural limitation for the present invention. The present invention could be implemented on a variety of hardware platforms, such as server 102 or client 107 shown in FIG. 1A. Requests for the collection of performance information may be initiated on a first device within the network, while a second device within the network receives the request, collects the performance information for applications executing on the second device, and returns the collected data to the first device.

Figure 1C:
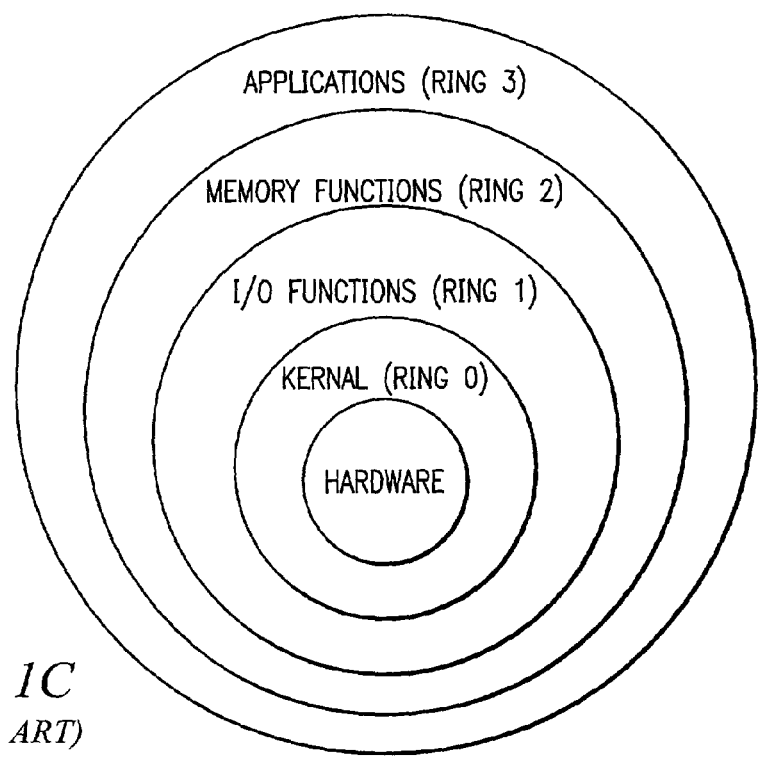
FIG. 1C depicts typical software components within a computer system illustrating a logical relationship between the components as functional layers of software.
Figure 1B:
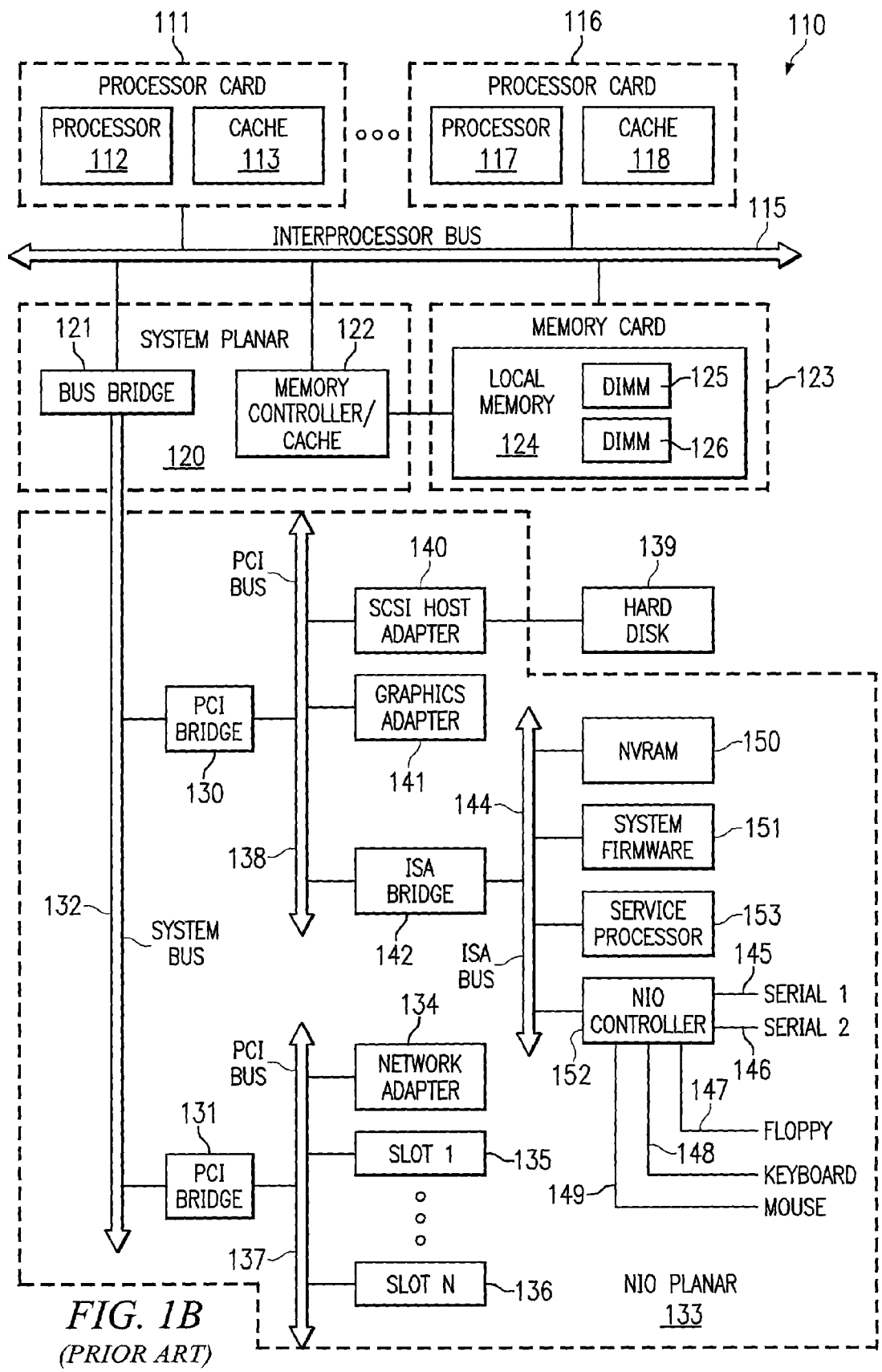
FIG. 1B depicts a typical computer architecture that may be used within a client or server in which the present invention may be implemented.

With reference now to FIG. 1B, a diagram depicts a typical computer architecture that may be used within a client or server, such as those shown in FIG. 1A, in which the present invention may be implemented. Data processing system 110 employs a variety of bus structures and protocols. Processor card 111 contains processor 112 and L2 cache 113 that are connected to interprocessor bus 115. System 110 may contain a plurality of processor cards; processor card 116 contains processor 117 and L2 cache 118.

Interprocessor bus 115 supports system planar 120 that contains bus bridge 121 and memory controller 122 that supports memory card 123. Memory card 123 contains local memory 124 consisting of a plurality of dual in-line memory modules (DIMMs) 125 and 126.

Interprocessor bridge 121 connects to PCI bridges 130 and 131 via system bus 132. PCI bridges 130 and 131 are contained on native I/O (NIO) planar 133 which supports a variety of I/O components and interfaces. PCI bridge 131 provides connections for external data streams through network adapter 134 and a number of card slots 135-136 via PCI bus 137. PCI bridge 130 connects a variety of I/O devices via PCI bus 138. Hard disk 139 may be connected to SCSI host adapter 140, which is connected to PCI bus 138. Graphics adapter 141 may also be connected to PCI bus 138 as depicted, either directly or indirectly.

ISA bridge 142 connects to PCI bridge 130 via PCI bus 138. ISA bridge 142 provides interconnection capabilities through NIO controller 152 via ISA bus 144, such as serial connections 145 and 146. Floppy drive connection 147 provides removable storage. Keyboard connection 148 and mouse connection 149 allow data processing system 110 to accept input data from a user.

Non-volatile RAM (NVRAM) 150 provides non-volatile memory for preserving certain types of data from system disruptions or system failures, such as power supply problems. System firmware 151 is also connected to ISA bus 144 and controls the initial BIOS. Service processor 153 is connected to ISA bus 144 and provides functionality for system diagnostics or system servicing.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention.

With reference now to FIG. 1C, a prior art diagram shows software components within a computer system illustrating a logical relationship between the components as functional layers of software. The kernel (Ring 0) of the operating system provides a core set of functions that acts as an interface to the hardware. I/O functions and drivers can be viewed as resident in Ring 1, while memory management and memory-related functions are resident in Ring 2. User applications and other programs (Ring 3) access the functions in the other layers to perform general data processing. Rings 0-2, as a whole, may be viewed as the operating system of a particular device. Assuming that the operating system is extensible, software drivers may be added to the operating system to support various additional functions required by user applications, such as device drivers for support of new devices added to the system.

In addition to being able to be implemented on a variety of hardware platforms, the present invention may be implemented in a variety of software environments. A typical operating system may be used to control program execution within each data processing system. For example, one device may run a Linux® operating system, while another device may run an AIX® operating system.

Figure 1D:
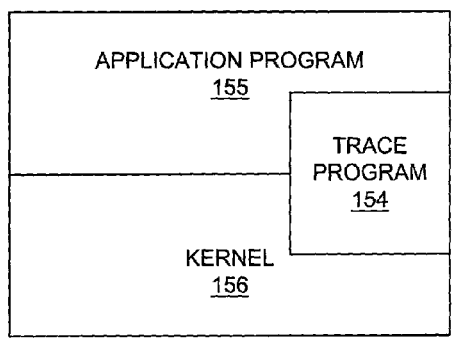
FIG. 1D depicts a typical relationship between software components in a data processing system that is being analyzed in some manner by a trace facility.

With reference now to FIG. 1D, a simple block diagram depicts a typical relationship between software components in a data processing system that is being analyzed in some manner by a trace facility. Trace program 154 is used to analyze application program 155. Trace program 154 may be configured to handle a subset of interrupts on the data processing system that is being analyzed. When an interrupt or trap occurs, e.g., a single-step trap or a taken-branch trap, functionality within trace program 154 can perform various tracing functions, profiling functions, or debugging functions; hereinafter, the terms tracing, profiling, and debugging are used interchangeably. In addition, trace program 154 may be used to record data upon the execution of a hook, which is a specialized piece of code at a specific location in an application process. Trace hooks are typically inserted for the purpose of debugging, performance analysis, or enhancing functionality. Typically, trace program 154 generates trace data of various types of information, which is stored in a trace data buffer and subsequently written to a data file for post-processing.

Both trace program 154 and application program 155 use kernel 156, which comprises and/or supports system-level calls, utilities, and device drivers. Depending on the implementation, trace program 154 may have some modules that run at an application-level priority and other modules that run at a trusted, system-level priority with various system-level privileges.

Figure 1E:
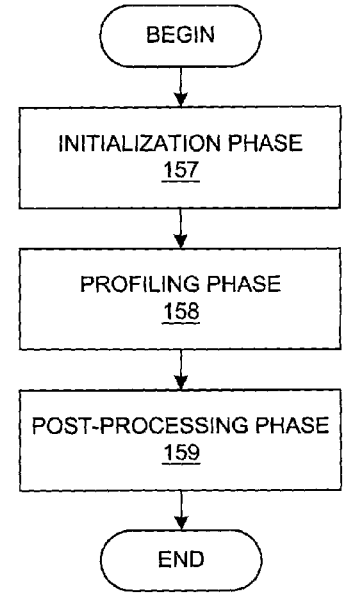
FIG. 1E depicts typical phases that may be used to characterize the operation of a tracing facility.

With reference now to FIG. 1E, a diagram depicts typical phases that may be used to characterize the operation of a tracing facility. An initialization phase 157 is used to capture the state of the client machine at the time tracing is initiated. This trace initialization data may include trace records that identify all existing threads, all loaded classes, and all methods for the loaded classes; subsequently generated trace data may indicate thread switches, interrupts, and loading and unloading of classes and jitted methods. A special record may be written to indicate within the trace output when all of the startup information has been written.

Next, during the profiling phase 158, trace records are written to a trace buffer or file. Subject to memory constraints, the generated trace output may be as long and as detailed as an analyst requires for the purpose of profiling or debugging a particular program.

In the post-processing phase 159, the data collected in the buffer is sent to a file for post-processing. During post-processing phase 159, each trace record is processed in accordance with the type of information within the trace record. After all of the trace records are processed, the information is typically formatted for output in the form of a report. The trace output may be sent to a server, which analyzes the trace output from processes on a client. Of course, depending on available resources or other considerations, the post-processing also may be performed on the client. Alternatively, trace information may be processed on-the-fly so that trace data structures are maintained during the profiling phase.

Figure 1F:
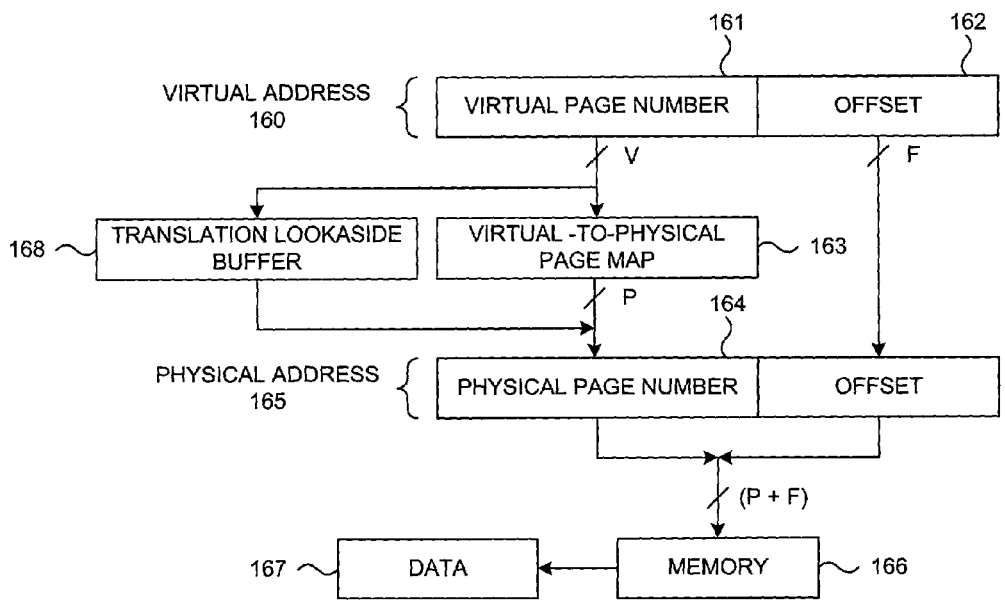
FIG. 1F depicts a typical memory addressing scheme for managing virtual memory within a data processing system.

With reference now to FIG. 1F, a diagram depicts a typical memory addressing scheme for managing virtual memory within a data processing system. When a functional unit within a processor needs to retrieve a datum, a memory address is used to locate the datum. Virtual memory schemes are used to present a large address space to a process on a data processing system with limited physical memory; virtual addresses may be mapped to physical addresses in a variety of well-known manners. The example shown in FIG. 1F depicts only pages, but it should be noted that similar schemes may incorporate different and/or additional memory fragmentation methodologies, such as segments, frames, etc.

Virtual address 160 comprises two portions: virtual page number 161 of "V" number of bits; and page offset 162 of "F" number of bits. Virtual page number 161 is used to access virtual-to-physical page map 163, which may also be termed a "page table". Virtual-to-physical page map 163 stores physical page numbers that have been indexed with an associated virtual page number; using virtual page number 161 as a lookup key, physical page number 164 of "P" bits can be retrieved, i.e. a virtual page number is mapped to a physical page number.

Together, physical page number 164 and page offset 162 comprise physical address 165 of "(P+F)" number of bits. Physical address 165 is presented to memory 166, which retrieves data 167 from the specified address. Additional caching mechanisms may also be included.

The page table/map is controlled and managed by the operating system and is usually kept in main memory, although various memory management schemes may enhance access to the page table with on-chip caches or registers that are located within the processor chip, such as translation lookaside buffer (TLB) 168. When the virtual page number is presented to the page table, it is simultaneously presented to the translation lookaside buffer. If there is a hit within the translation lookaside buffer, i.e., the translation lookaside buffer has an entry containing the virtual page number, then the physical page number is retrieved from the entry in the translation lookaside buffer. In addition, since an access to the translation lookaside buffer within the processor is much quicker than an access to the page table within main memory or some other cache, then the lookup in the page table is aborted or ignored because an access to the translation lookaside buffer completes first.

Figure 1G:
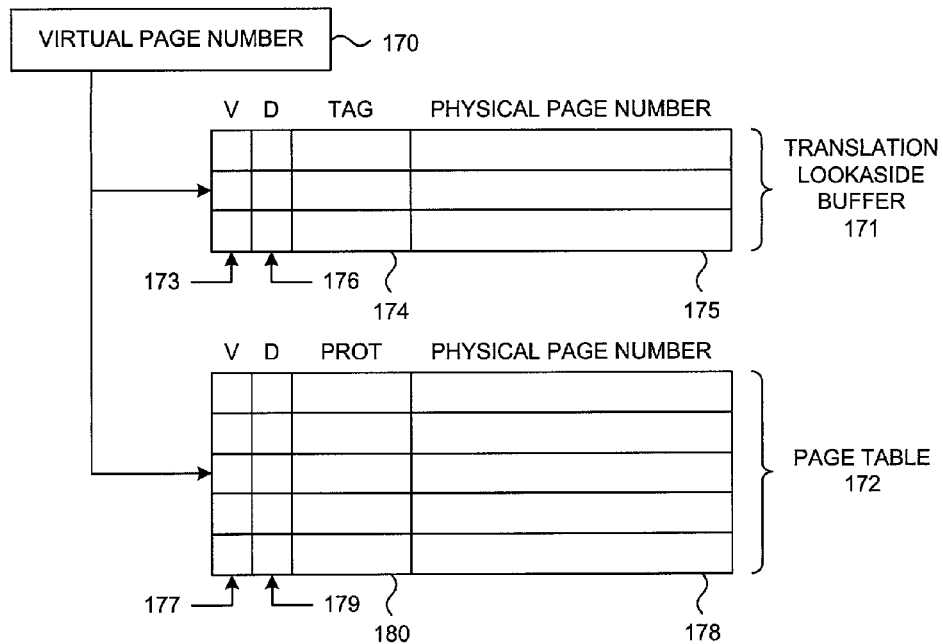
FIG. 1G depicts the structure of a typical translation lookaside buffer (TLB) and the structure of a typical page table for assisting with virtual memory management within a data processing system.

With reference now to FIG. 1G, a diagram depicts the structure of a typical translation lookaside buffer and the structure of a typical page table for assisting with virtual memory management within a data processing system. As mentioned with respect to FIG. 1F, virtual page number 170 is simultaneously asserted to translation lookaside buffer 171 and page 172.

Valid bit 173 in translation lookaside buffer 171 indicates whether a particular entry is being used. Translation lookaside buffer 171 is an associative memory; rather than addressing an associative memory with an address or an index, a tag is associated with each entry in the associative memory, and if a lookup value matching a tag is asserted, then the stored entry value in the matching entry is returned. In the case of a translation lookaside buffer, tag 174 is a virtual page number, and each entry contains physical page number 175 that has been associated with the virtual page number. Other data may be contained within each entry to manage various operations. In this example, dirty bit 176 indicates that a write to the physical page has occurred so that various flush, write-back, or write-through schemes can be managed.

Valid bit 177 in page table 172 indicates whether a particular entry is being used. Page table 172 is typical memory structure or array in which virtual page number 170 is used as an index into the page table, and the indexed entry is accessed to retrieve and return the associated physical page number 178. In certain implementations, a page table entry may hold a disk address to which a physical page has been swapped. Other data may be contained within each entry to manage various operations, such as dirty bit 179. Protection indicator 180 is another system-related item that may be stored within an entry and may comprise a few bit flags; these protection flags indicate various permissions that have been set for a page. For example, each page may be marked as read-only, write-only, execute-only, or some combination of read, write, and execute permissions or protections.

Figure 1H:
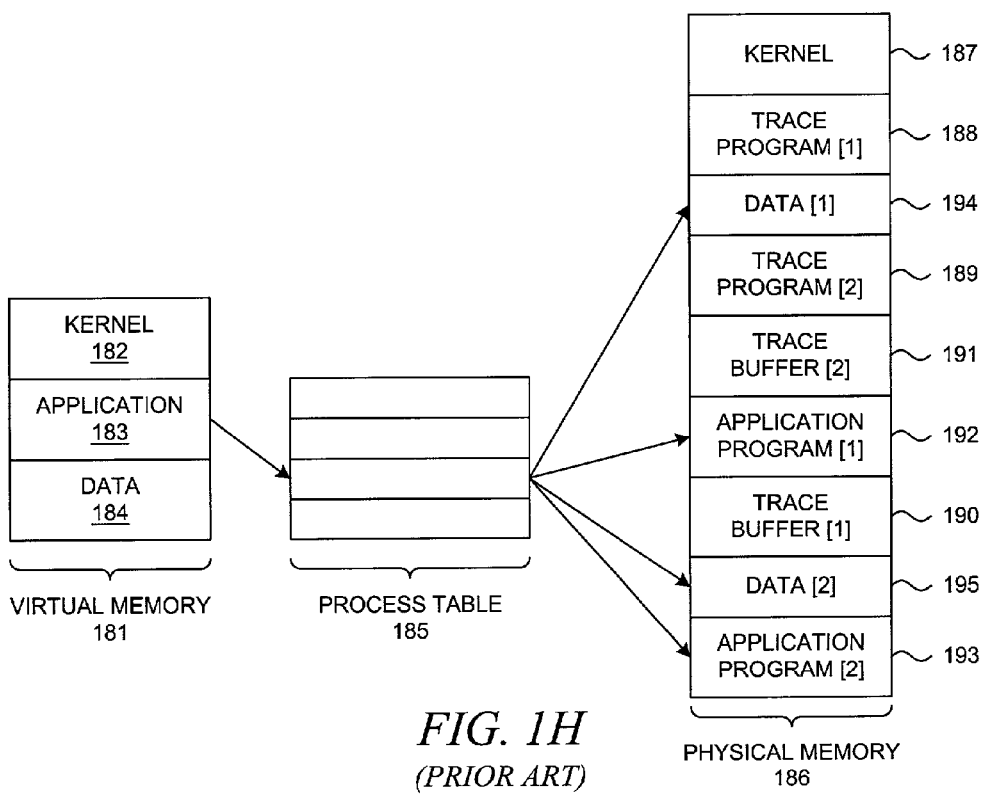
FIG. 1H depicts a typical map of an operational physical address space in conjunction with an operating system process table and an application's view of its virtual address space.

With reference now to FIG. 1H, a block diagram depicts a typical map of an operational physical address space in conjunction with an operating system process table and an application's view of its virtual address space. Virtual memory space 181 represents an application's view of its virtual address space. Kernel 182 may be "loaded" at the lowest addresses, while application 183 is "loaded" at higher addresses. When application 183 generates a memory allocation request for a data block, it may appear that a chunk of memory is always allocated from virtual memory at addresses that are higher than the location of the application itself, i.e. data region 184. If a trace program is also active within the system, it should be invisible to the application program.

The operating system performs memory management operations using various data structures, including a page table and process table 185, to ensure that the application program has this view of its address space. However, the memory map of physical memory 186 is much more discontiguous because memory may be allocated wherever possible depending on the amount of memory that is needed, the amount of memory that is available, and the page replacement algorithm. A typical snapshot of memory would show various allocation block sizes that are separated by unused portions of memory.

In the example shown in FIG. 1H, kernel 187 is loaded at the lowest addresses, and a first portion of trace program 188 is also loaded low. However, the trace program has been split, and a second portion of trace program 189 has been loaded higher. The trace buffer that the trace program needs for holding its output has also been split into a first trace buffer portion 190 and a second trace buffer portion 191. The application program has been split into a first application program portion 192 and a second application program portion 193, while data blocks have been allocated for the application program as data block 194 and data block 195.

The operating system uses process table 185 to track various information about an application process, including the location of its memory blocks. For example, when an application terminates, all of its memory blocks should be marked for garbage collection. It should be noted that various types of data structures may be used by an operating system to manage processes and memory, and the example shown in FIG. 1H is merely one example of many different schemes that may be used to track memory operations on behalf of an application process.

Moreover, the protection bits that were described above with respect to FIG. 1G may be also be stored within process table 185 that is shown in FIG. 1H or some other operating system data structure. In general, when an application file is loaded into memory, executable segments are marked as execute-only to protect them from being read or written, which might occur when an application process is operating erroneously or erratically.

As mentioned previously, instruction tracing is an important analysis tool, but instruction tracing is difficult to perform reliably because the act of accessing an instruction to be traced may cause interrupts, thereby causing unwanted effects at the time of the interrupt and generating unwanted trace output information. Hence, it would be advantageous to provide instruction tracing methodologies with an enhanced ability to avoid generating interrupts in order to minimize any unwanted trace output information. The present invention is directed to a set of related methodologies to be used within instruction tracing software to reduce its tendency to generate interrupts. With FIGS. 1A-1H as background, the present invention is described in more detail further below with respect to the remaining figures.

As mentioned above with respect to FIG. 1H, an operating system on a data processing system typically segments physical memory into segments, pages, frames, or other type of memory block, and applications are loaded into these portions of memory using a variety of techniques. A common feature with most operating systems is the ability of the operating system to protect executable code by marking a block of memory as execute-only; when an attempt is made to access an execute-only memory block, the operating system must not only determine that the accessing kernel or application process has the appropriate privileges to access the memory block, but it must also determine that the access is only for the purpose of executing instructions within the memory block. If the access is a read or a write, then the operating system would signal some type of error through an appropriate hardware or software interrupt.

This type of error is particularly troublesome to a tracing program that has instruction tracing functionality. At some point in time, the tracing program is given execution control, typically through a single-step or trap-on-branch interrupt. At that point in time, an instruction pointer within the processor indicates the next instruction to be executed for the interrupted application; the instruction pointer points to the address of the next instruction, which is most likely within an execute-only memory block that holds the instructions for an application process.

In some cases, the processor may prefetch instructions into an instruction cache. Hence, at the point in time that the single-step or trap-on-branch interrupt occurs, the processor may have a copy of the instruction in an instruction cache or some other unit within the processor, such as an instruction decode unit. However, certain internal structures within the processor are only accessible to the microcode or nanocode within the processor, and these internal structures are not accessible to application-level code. In other words, there are no processor instructions that can be used by the tracing program to read the processor's copy of the instruction if the processor already has a copy.

Hence, in order to perform the instruction tracing operation, the tracing program attempts to read the current instruction by using the address that is indicated by the instruction pointer. However, since the instruction is contained within an execute-only memory block, the attempted access of the instruction by the tracing program causes some type of error signal for which the tracing program must compensate.

It should be noted that the instruction tracing functionality of the present invention may be placed in a variety of contexts, including a kernel, a kernel driver, an operating system module, or a tracing process or program. Hereinafter, the term "tracing program" or "tracing software" is used to simplify the distinction versus typical kernel functionality and the processes generated by an application program. In other words, the executable code of the tracing program may be placed into various types of processes, including interrupt handlers.

In addition, it should be noted that hereinafter the term "current instruction address" or "next instruction" refers to an instruction within an application that is being proflied/traced and does not refer to the next instruction within the profiling/tracing program. When a reference is made to the value of the instruction pointer, it is assumed that the processor and/or operating system has saved the instruction pointer that was being used during the execution of the application program; the instruction pointer would be saved into a special register or stack frame, and this saved value is retrievable by the tracing program. Hence, when an instruction pointer is discussed herein, one refers to the value of the instruction pointer for the application program at the point in time at which the application program was interrupted.

Since the tracing program is aware that its subsequent actions are going to cause this error signal, the tracing program gains control over the handling of this error signal in order to prevent this error signal from being processed within the operating system. Although the manner in which the tracing program avoids the propagation of this error signal may vary with the hardware, the operating system, and the implementation of the tracing program, the tracing program typically asserts control by registering a hardware or software interrupt handler into the appropriate entry of an interrupt vector table that is used to process this type of error signal. This action may be performed when the tracing program is in its initialization phase, as shown in FIG. 1E. Therefore, whenever the error signal occurs, the appropriate functionality from the tracing program is in place to allow the tracing program to operate as necessary. The tracing program may then access execute-only memory blocks to get copies of instructions for the instruction tracing functionality.

The typical solution to the above-described instruction tracing problem can be problematic. Within the art of application debugging/profiling, it is generally preferable to tread lightly in the number and magnitude of changes within the system that is being observed. In this case, the typical solution to accessing instructions within an execute-only memory block has allowed the tracing program to cause an error condition that is subsequently remedied. In contrast, the present invention provides a solution that avoids causing an additional problem.

With reference now to FIGS. 2A-2B, a pair of flowcharts depicts a methodology for reducing the tendency of instruction tracing software to generate interrupts during the operation of retrieving an instruction in accordance with the present invention. FIG. 2A depicts a process performed during an initialization phase of the tracing program, whereas FIG. 2B depicts a process performed during the profiling phase of the tracing program.

Referring to FIG. 2A, the process begins when the initialization phase of the tracing program is initiated (step 202). At some point during the initialization phase, the tracing program locates the page fault handler within the kernel or operating system (step 204). The tracing program then registers a page fault handling extension into the page fault handler (step 206).

The manner in which additional page fault handling is registered may be accomplished in a variety of manners that depends on the operating system and the configuration of the page fault handler. For example, the operating system may be configured to allow extensions to be inserted into kernel functions by providing a system function call, service call, or other type of function by which additional processing can be requested after the kernel function has completed but before it returns control to its calling point. In this manner, the kernel module first completes its functionality, after which additional functionality can be chained onto the event that is being processed by the kernel function. Alternatively, the tracing program may entirely replace the kernel module with a special version that contains the functionality desired by the tracing program. Alternatively, the tracing program may dynamically instrument the kernel module by dynamically inserting a function call into the kernel module. In any case, after a link to the required additional functionality has been registered, then the initial portion of this methodology is complete.

Referring to FIG. 2B, the process begins when a page fault handler is invoked to handle a page fault during the profiling phase of the execution of an application (step 212). The page fault handler loads the appropriate page with the appropriate protection flags in an ordinary fashion (step 214), after which the page fault handler detects and calls the page fault handling extension of the tracing program (step 216).

At this point, the page fault handling extension may perform an optional step to check the process identifier of the currently executing application in order to determine whether the currently executing application is being profiled by the tracing program, thereby ensuring that the tracing program does affect the operational environment of applications that are not being profiled.

The page fault handling extension then clears the execute-only flag on the recently loaded page (step 218). In addition, the page fault handling extension may need to set a read privilege flag so that the tracing program can read from the page. Depending on the operating system or processor architecture, execution protection for memory blocks may be implemented by setting flags that indicate that a particular operation is allowable. For example, an execute flag is set to indicate that the page can be executed but not necessarily indicating that it is an execute-only page; in this case, there would be no execute-only flag to be reset, and the page fault handling extension would need to set the read flag to indicate that read operations are allowable on the recently loaded page.

In any case, the page fault handling extension then returns control to the page fault handler (step 220), and the page fault handler then completes its processing and returns control to the caller or appropriate return location (step 224), thereby completing the process.

As noted above, the implementation of the present invention may depend on the operating system or other contextual details. One of ordinary skill in the art should understand that a segment fault handler or other memory management task may be the appropriate location for asserting the functionality of the present invention. Moreover, the memory protection flags may need to be set or cleared in more than one location within the system; in addition, alternative operations may be required to block the system's use of execute-only protection.

In this manner, the present invention reduces interrupts that may be caused by execute-protected memory blocks that are allocated to an application program that is being profiled. As noted above, the typical prior art solution to accessing instructions within an execute-protected memory block has allowed the tracing program to cause an error condition that is subsequently remedied. In contrast, the present invention provides a solution that avoids causing an additional problem and that integrates well with other functionality within the operating system.

Reading an instruction so that it may be recorded is one potential point at which a tracing program may trigger unnecessary interrupts. This potential problem is caused by the act of accessing memory by the tracing program. Other potential interrupts related to initially fetching the instruction are generally inconsequential, i.e., these actions have occurred prior to the point in time at which the tracing program attempts to read the instruction.

Specifically, as noted above, at some point in time during the profiling phase, the tracing program is given execution control, typically through a single-step or trap-on-branch interrupt. In some cases, the processor may have prefetched instructions into an instruction cache or some type of L1 cache within the processor. Hence, at the point in time that the single-step or trap-on-branch interrupt occurs, the processor may already have a copy of the instruction in an instruction cache or some other unit within the processor, such as an instruction decode unit. In order to prefetch an instruction, a TLB miss and possibly a page fault may have occurred and been processed.

However, writing an instruction during the act of tracing or recording the instruction is a possible point at which a tracing program may trigger unwanted interrupts. As the tracing program performs its profiling operations, it generates and writes data, e.g., traced instructions, to its output buffer. A potential problem is caused by the act of accessing memory by the tracing program to store the retrieved instruction; a TLB miss and a page fault may possibly occur. In this case, at least one interrupt most likely would be generated, and these interrupts would be consequential; at a minimum, these actions would cause unwanted trace output information to be generated for interrupts that are caused by the tracing program itself. The present invention provides a solution that avoids causing an additional problem.

With reference now to FIG. 3, a flowchart depicts a methodology for reducing the tendency of instruction tracing software to generate interrupts during the operation of recording an instruction in accordance with the present invention. The process begins when the initialization phase of the tracing program is initiated (step 302). At some point during the initialization phase, the tracing program allocates a contiguous trace buffer (or possibly multiple trace buffers) in physical memory, maps the buffer to its virtual address space, and pins the buffer (step 304). At this point, the initial configuration for the methodology is then complete.

The operations of mapping memory and pinning memory are well-known. An operating system must allocate physical memory to support an application program's virtual address space; in other words, when a portion of virtual memory is used, it must be supported by physical memory at some point. When necessary, the application program can generate a memory allocation request to the operating system, and the operating system provides a memory block to the application in the form of a pointer to the memory block within the application's virtual address space, although the allocation may be performed in conjunction with array allocations or in some other form. In some cases in which the application program has the appropriate privileges, the application can request that the memory block be allocated in physical memory such that the application is given a physical address pointer to the memory block. The application can then access the memory block using physical addressing rather than virtual addressing.

The application can also access the previously allocated memory block using virtual addressing if the memory block is mapped into its virtual address space. Typically, the application uses a system function call to request that the operating system map the previously allocated memory block into its virtual address space.

A virtual address space for an application is usually much larger than the actual amount of physical memory of the machine on which the application is executing, and the operating system handles this situation, at least in part, with a paging mechanism. The operating system uses a paging mechanism to write out the contents of physical memory to disk, which allows the operating system to swap in alternate contents.

An operating system can pin the virtual memory pages that are within a specified address range in an application program's address space. Pinning a memory region prohibits the operating system's paging mechanism from paging out the real memory pages that are backing the pinned memory region. Once the memory region is pinned, any access to that memory region cannot result in a page fault, thereby preventing interrupts that accompany page faults. Typically, the operating system provides a system function call specifically for the pinning operation. Depending on the system and operating system, alternative actions may be needed in addition to a pinning operation to prevent a TLB miss while accessing the trace output buffer.

The present invention recognizes the advantages that may be gained by using physical addressing to access a trace output buffer on behalf of instruction tracing software. The present invention maps the trace output buffer through an appropriate operating system function call, i.e., step 304 above. At any subsequent point in time, the instruction tracing software then addresses the trace output buffer using non-virtual addressing, i.e., physical addressing instead of virtual addressing. By using non-virtual addressing, there is no opportunity for TLB misses, which could occur when addressing the trace output buffer via virtual addressing. In a particular embodiment that uses the Intel® IA-64 processor architecture, the "dt" bit (data address translation bit) of the processor status register ("psr.dt") can be used to control virtual addressing versus physical addressing. When the "psr.dt" bit is set to "1", virtual data addresses are translated; when the "psr.dt" bit is set to "0", data accesses use physical addressing.

This is particularly advantageous because a TLB miss while processing an interrupt can cause unintended consequences unless the full state of the processor was saved by the interrupt code. For example, a TLB miss with respect to the trace output buffer by the instruction tracing software would cause part of the TLB to be flushed in favor of the trace output buffer. However, if the trace output buffer finished processing and returned execution control to the application that is being traced, then it may experience TLB misses that it would not have experienced but for the actions of the instruction tracing software and the changed TLB.

In a particular embodiment, only the instruction trace software uses physical addressing while it is processing an interruption while other portions of the tracing code may use virtual addressing. Alternatively, all of the tracing code may use physical addressing.

In an alternative embodiment using the Intel® IA-64 processor architecture, TLB misses can be avoided by using a translation register. Translation registers are managed by software, and once an address translation is inserted into a translation register, it remains in the translation register until overwritten or purged. Translation registers are used to lock critical address translations; all memory references made to a translation register will always hit the TLB and will never cause a page fault. With respect to the present invention, a translation register could be configured for the trace output buffer during the initialization phase, such as step 304 shown in FIG. 3, thereby ensuring that there are no TLB misses for the trace output buffer. In this alternative embodiment, the trace output buffer would not necessarily be initially allocated within physical memory; the trace output buffer may be allocated and pinned within the tracing software's virtual address space, and the appropriate address or addresses for the trace output buffer would then be inserted into the appropriate translation registers.

FIG. 3 depicts a methodology for avoiding interrupts during a write operation associated with the trace output buffer. As mentioned above, FIGS. 2A-2B depict a methodology for avoiding interrupts during a read operation associated with fetching an instruction because reading an instruction in order to record it is one potential point at which a tracing program may trigger unnecessary interrupts. The methodology described with respect to FIGS. 2A-2B ignores other potential interrupts related to initially fetching the instruction as being inconsequential, as noted above, because these actions have occurred prior to the point in time at which the tracing program attempts to read the instruction. This is possible because the processor may have prefetched instructions into an instruction cache or some type of L1 cache within the processor. However, many processors do not have prefetch functionality. In other cases, the processor architecture might have other potential interrupts that need to be considered. For these other architectures, another methodology may be required for avoiding interrupts associated with fetching an instruction.

Figure 4A:
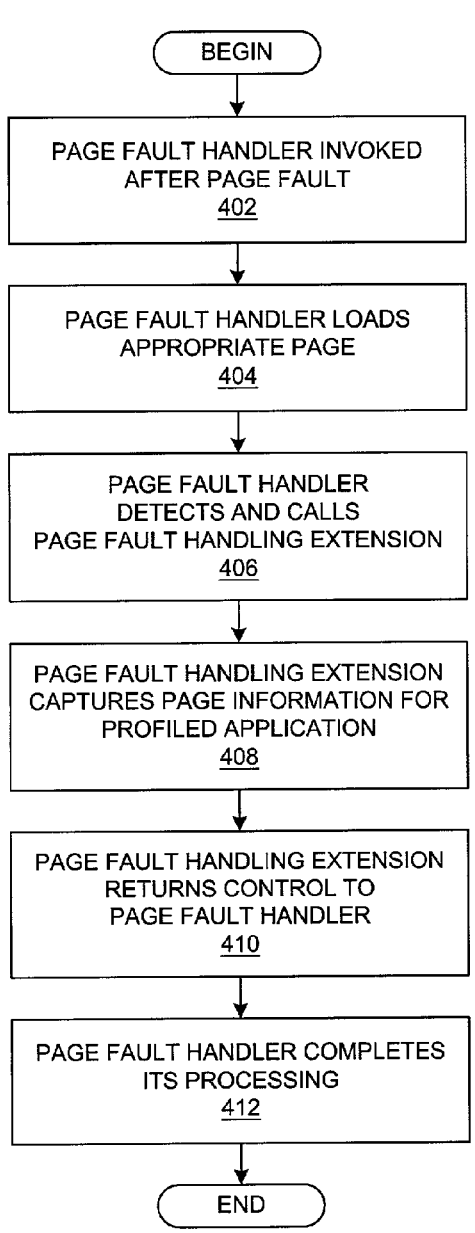
FIGS. 4A-4C depict a methodology for tracing instructions by capturing instruction addresses and resolving those addresses against code modules during a post-processing phase to obtain the actual instructions
Figure 4B:
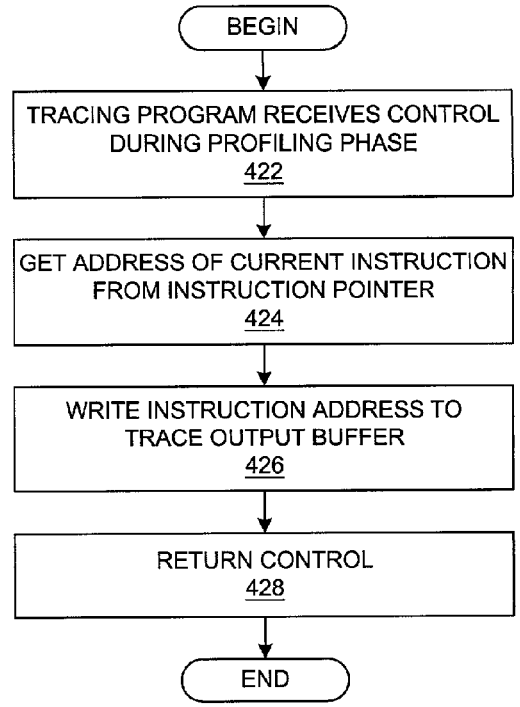
Figure 4C:
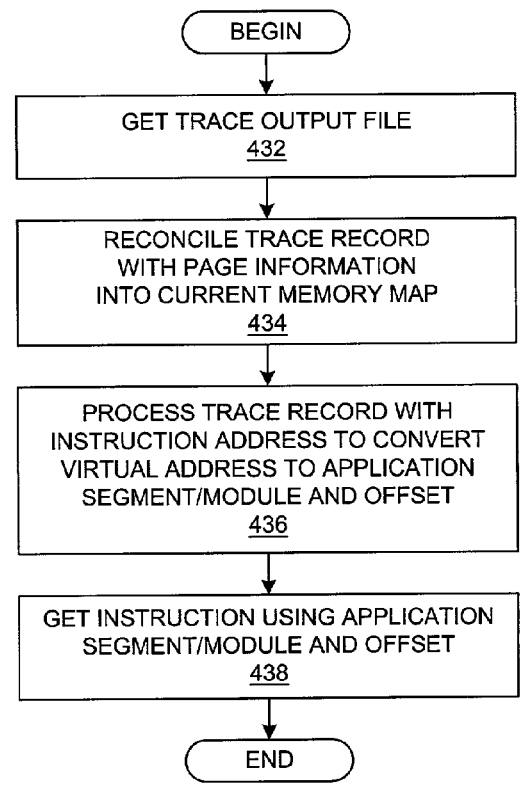

With reference now to FIGS. 4A-4C, a set of flowcharts depicts a methodology for tracing instructions by capturing instruction addresses and resolving those addresses against code modules during a post-processing phase to obtain the actual instructions in accordance with the present invention. Rather than capturing a copy of the current instruction during an instruction tracing operation, which might generate unwanted interrupts, the methodology that is depicted in FIGS. 4A-4C captures only the address of the current instruction. With this methodology, there is no attempt to read the instruction from memory, thereby eliminating the chance for generating unwanted interrupts while reading the instruction.

However, the address of the current instruction is a virtual memory address, and a virtual memory address can only be interpreted with respect to a specific operational state of the system. In particular, a virtual memory address typically comprises a virtual page number. Therefore, information about the current operational state of the system must also be captured along with instruction addresses. When the instruction addresses are subsequently processed during the post-processing phase, then the state information is also processed in order to construct a representational memory map at the time that the instructions was captured.

The processes that are shown in FIGS. 4A-4B are similar to the processes that are shown in FIGS. 2A-2B. In FIG. 2A, during the initialization phase of the tracing program, the tracing program registers a page fault handling extension into the page fault handler. The page fault handling extension subsequently performs certain tasks on behalf of the tracing program when a page fault is processed. In a similar manner, the methodology shown in FIGS. 4A-4B assumes that a page fault handling extension has been registered to be associated with the page fault handler by the tracing program during the initialization phase. It should be noted, however, that other methodologies may be employed to capture page information for a particular application during the profiling phase of the tracing program.

Referring to FIG. 4A, the process begins when a page fault handler is invoked to handle a page fault during the profiling phase of the execution of an application (step 402). The page fault handler loads the appropriate page in an ordinary fashion (step 404), after which the page fault handler detects and calls the page fault handling extension of the tracing program (step 406). At this point, the page fault handling extension may perform an optional step to check the process identifier of the currently executing application in order to determine whether the currently executing application is being profiled by the tracing program, thereby ensuring that the tracing program does affect the operational environment of applications that are not being profiled.

The page fault handling extension then captures the page table (step 408), the process table for the profiled application, and/or any other segment-related or page-related information and/or subset of that information. This information that may be needed to reconstruct the memory map of the application that is currently being profiled; this information is written to the trace output buffer. The page fault handling extension then returns control to the page fault handler (step 410), and the page fault handler then completes its processing and returns control to the caller or appropriate return location (step 412), thereby completing the process.

The captured page information comprises information about the manner in which the operating system loaded the segments or modules of a profiled application into various memory blocks, i.e. portions of the application's virtual address space. With each page fault, the page information is updated and then captured. Hence, the trace analysis tool is able to generate a temporally accurate memory map by associating the application segments or modules that are being loaded with the memory blocks containing the executable code for the profiled application. Alternatively, the page information could be captured by deploying a profiling version of the operating system module that is responsible for receiving calls to load the application modules; this profiling version of the module would also capture any required operating-system-defined memory allocation information.

Referring to FIG. 4B, the tracing program receives control during the profiling phase (step 422), most likely in response to handling a single-step trap, a taken-branch trap, a break instruction fault, or some similar trap. The address of the current instruction is obtained by reading the instruction pointer value (step 424). The instruction address is then written to the trace output buffer (step 426) and control is then returned to the appropriate location (step 428), thereby completing the process.

Referring to FIG. 4C, a process is shown that may be completed during the post-processing phase. At this point, the trace output buffer has been written to a trace output file after an application has been profiled, and a trace analysis tool that is associated with the tracing program obtains the trace output file (step 432). The trace analysis tool then steps through the records within the trace output file; the records also comprise timestamp information associated with the time that a record was generated.

As the records from the trace output file are processed, a trace record containing page information, which would have been generated in step 408 shown in FIG. 4A, is analyzed and reconciled with the tool's current memory map for the application (step 434). The captured page information comprises information about the manner in which the operating system loaded the segments or modules of a profiled application into various memory blocks. Hence, the trace analysis tool is able to generate a temporally accurate memory map by associating the application segments or modules with the memory blocks containing the executable code for the profiled application.

As other records from the trace output file are processed, the trace analysis tool will encounter trace records containing instruction addresses; in order to be more efficient, sets of instruction addresses may have been placed into a single trace record. An instruction address is then converted into an application segment or module along with an offset into that segment or module using the tool's current memory map for the application (step 436). For example, the current memory map may comprise the virtual addresses ranges or virtual page numbers into which the application's segments or module were loaded, and the virtual page number (the most significant portion of the virtual address) of an instruction's virtual address from a trace record can be compared to the virtual address ranges or virtual page numbers of the segments or modules. After an inclusive virtual address range is found, then the associated module or segment is identified, and the offset (the least significant portion of the virtual address) is used to access the segment or module.

In any case, the segment or module and its offset is known, and a copy of the instruction is then retrieved (step 438), thereby completing the process.

The methodology shown in FIGS. 4A-4C can be compared with a methodology that is present in processors that are manufactured in accordance with the Intel® IA-64 architecture. The branch trace buffer in an IA-64 processor provides information about the outcome of the execution of the most recent IA-64 branch instructions. In every cycle in which a qualified IA-64 branch retires, its source bundle address and slot number are written to the branch trace buffer; the branch's target address is also recorded. Hence, a rolling subset of addresses for the most recent branch instructions is captured. In contrast, the present invention provides a methodology for capturing the addresses of all instructions in conjunction with instruction address resolution information that subsequently allows software to obtain a copy of the instruction using a captured instruction address.

The methodology shown in FIGS. 4A-4C works well for tracing instructions from application modules that have been loaded from application files on disk. However, many operational environments comprise a code generator in which executable object code is generated on-the-fly, e.g., jitted (just-in-time compiled) code that executes under the control of a virtual machine. In that case, there are no pre-existing application segments or modules against which traced instruction addresses may be resolved during a post-processing phase.

Figure 4D:
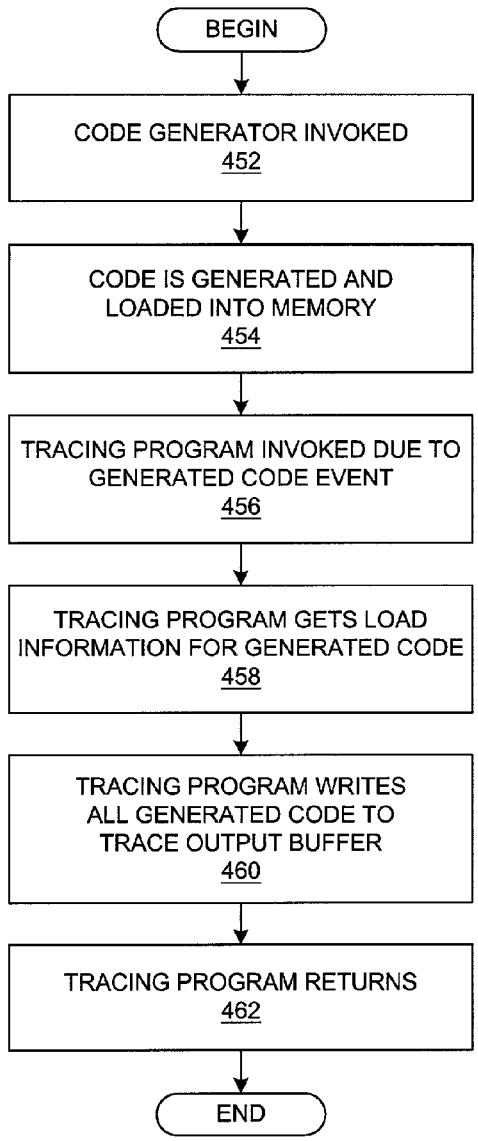
FIGS. 4D-4E depict a methodology for tracing instructions in generated code by capturing instruction addresses from the generated code and also capturing the generated code and then resolving those addresses against the generated code during a post-processing phase to obtain the actual instructions.
Figure 4E:
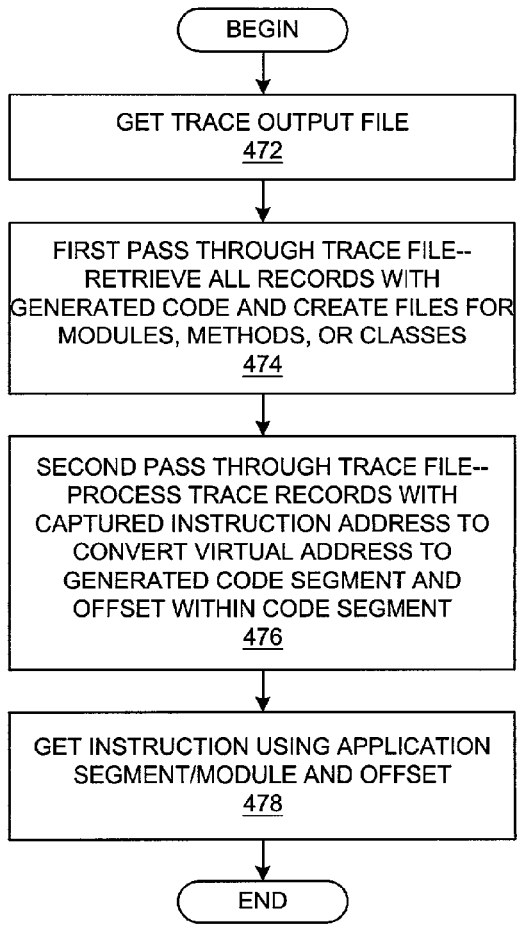

With reference now to FIGS. 4D-4E, a set of flowcharts depicts a methodology for tracing instructions in generated code by capturing instruction addresses from the generated code and also capturing the generated code and then resolving those addresses against the generated code during a post-processing phase to obtain the actual instructions. The methodology that is shown in FIGS. 4D-4E is similar to the methodology that is shown in FIGS. 4A-4C but which has been modified for generated code.

Referring to FIG. 4D, the process begins with a code generator being invoked (step 452), which generates code and loads the generated code into memory (step 454). For example, a Java runtime environment may include a just-in-time (JIT) compiler that compiles Java bytecodes into native machine code. Such actions are usually performed on an as-needed basis; when an executing method calls a method within a class that has not yet been loaded, the called class will be jitted and then loaded into memory.

In this example, the runtime environment would have been previously configured so that the tracing software is invoked upon the occurrence of certain events during the operation of the runtime environment, e.g., by configuring a special version of the runtime software with hooks at certain locations within the runtime software. When those events occur, the tracing software can perform its tracing functions. In this case, the tracing program is invoked upon the occurrence of the generated code event (step 456).

The tracing program obtains information about the newly generated and loaded application code (step 458). This may be done by inspecting various data structures in the runtime environment or by determining which class or method is being executed within the application program. There are various methodologies for determining such information, which can be found in the following copending and commonly assigned applications entitled "SYSTEM AND METHOD FOR PROVIDING TRACE INFORMATION REDUCTION", U.S. application Ser. No. 08/989,725, filed on Dec. 12, 1997, currently pending, "A METHOD AND APPARATUS FOR STRUCTURED PROFILING OF DATA PROCESSING SYSTEMS AND APPLICATIONS", U.S. application Ser. No. 09/052,329, currently pending, filed on Mar. 31, 1998, "A METHOD AND APPARATUS FOR STRUCTURED MEMORY ANALYSIS OF DATA PROCESSING SYSTEMS AND APPLICATIONS", U.S. application Ser. No. 09/052,331, currently pending, filed on Mar. 31, 1998, and "METHOD AND APPARATUS FOR PROFILING PROCESSES IN A DATA PROCESSING SYSTEM", U.S. application Ser. No. 09/177,031, currently pending, filed on Oct. 22, 1998, all of which are hereby incorporated by reference.

After determining which segment or module within the application code has been loaded, the tracing program reads all of the generated code, writes it to the trace output buffer (step 460), and then returns (step 462). In this manner, the tracing program is able to capture all of the generated application code, which would otherwise not be available on disk during the post-processing phase. The captured application code is used during the post-processing phase to resolve subsequently captured instruction addresses. If necessary, other instruction resolution information, such as the operating-system-defined memory allocation information discussed with respect to FIG. 4A, could be captured and written to the trace output buffer.

After the generated code has been captured, the tracing program captures instruction addresses in the manner that was described with respect to FIG. 4B. Referring to FIG. 4E, a flowchart shows a process that occurs during a post-processing phase to match the captured instruction addresses with the actual instructions. In this example, a post-processing application makes multiple passes through the trace output file, but the trace output file may be processed in a variety of ways that are applicable to the present invention. For example, the instruction information can be maintained in a real-time database that reflects the state of the system at a given point in time. As records are processed, the database is updated. When information, such as an instruction, is needed, the database is accessed, and the instruction is retrieved. This approach allows for dynamic loading and unloading of instructions, modules, etc.

The process begins by obtaining the trace output file (step 472), which contains the generated code and the instruction addresses along with other trace information. During the first pass through the trace output file, all trace records that contain generated code are retrieved, and the generated code is then written into one or more files for subsequent use (step 474). During a second pass through the trace output file, all trace records that contain captured instruction addresses are retrieved, and those virtual addresses are reconciled with the generated code modules that were created during the first pass through the trace output file (step 476). After a code module, segment, class, or other entity is found to contain the code that corresponds to the instruction address, a copy of the instruction corresponding to the traced instruction address is retrieved (step 478). This process is performed repeatedly for all instruction addresses, and these copies of the instructions can be written to a separate file for additional post-processing operations.

As shown above, FIGS. 4A-4E depict a methodology for capturing instruction addresses that are subsequently resolved during the post-processing phase. This methodology has the advantage of avoiding any attempt to fetch a copy of an instruction while tracing instructions during the profiling phase of a tracing program, thereby reducing the occurrence of interrupts. In contrast, FIGS. 5B-5D depict different methods for attempting to fetch a copy of an instruction during the profiling phase, i.e., while actively tracing instructions, but the methodology that is shown in these figures also avoids attempting to fetch a copy of an instruction until after the processor has fetched a copy of the instruction during its normal execution flow.

Figure 5A:
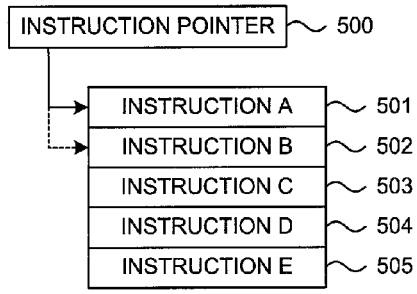
FIG. 5A depicts a typical operation with an instruction pointer containing an address that references a first instruction and then subsequently references a second instruction.
Figure 5C:
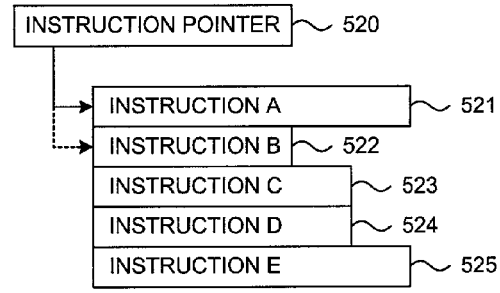
FIG. 5C depicts an instruction pointer containing an address that references a first instruction and then subsequently references a second instruction, wherein the instructions have variable lengths.
Figure 5B:
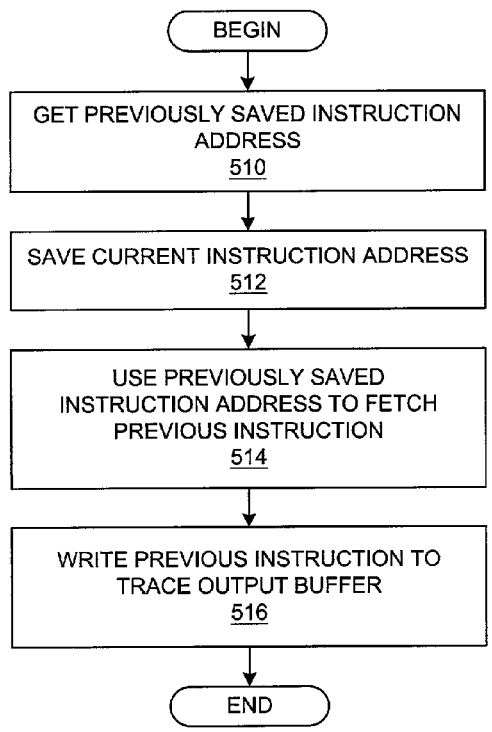
FIG. 5B depicts a methodology for avoiding the generation of additional interrupts by delaying an instruction fetch during single-step trap processing.
Figure 5D:
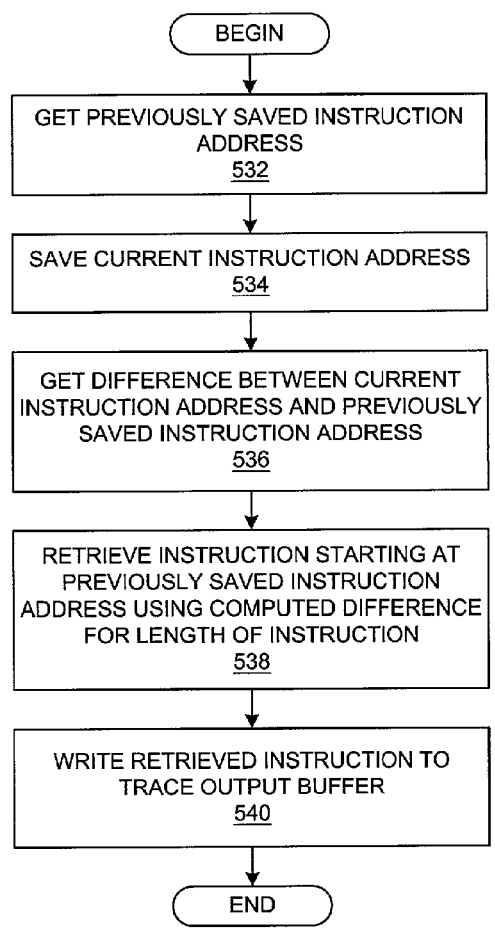
FIG. 5D depicts a methodology for delaying an instruction fetch during single-step trap processing for variable length instructions.

With reference now to FIG. 5A, as background, a block diagram depicts a typical operation of an instruction pointer containing an address that references a first instruction and then subsequently references a second instruction. At some point in time, an interrupt handler for a single-step trap, which was previously configured or set up by a tracing program, receives execution control. At that point in time, instruction pointer 500 points to instruction 501 as the next instruction in a series of instructions 501-505. After the single-step trap has been handled, instruction 501 is executed. The single-step trap is processed again, and at that point in time, instruction pointer 500 points to instruction 502.

It should be noted again that one refers to the next instruction within the application program and the value of its instruction pointer at the point in time that the application program was interrupted, not the next instruction in an interrupt handler or the value of an instruction pointer associated with the execution of the interrupt handler.

In a typical instruction tracing program or process, when a single-step trap is processed, a copy of the instruction would be obtained using the address in the instruction pointer. In contrast, a novel methodology is presented in FIG. 5B.

With reference now to FIG. 5B, a flowchart depicts a methodology for avoiding the generation of additional interrupts by delaying an instruction fetch during single-step trap processing that is handled by a tracing program in accordance with the present invention. The process shown in FIG. 5B presents a series of steps that would be performed by a single-step trap handler that has been called after the execution of an instruction.

The process begins by retrieving a previously saved instruction address (step 510), which was saved during a previous invocation of the single-step trap handler; a flag may be set/reset to indicate when the single-step trap handler is being invoked for the first time during a tracing session. The current instruction address is then saved in an appropriate memory location (step 512); the current instruction address, i.e., the address of the next instruction to be executed, resides in the instruction pointer.

The previously saved instruction address is then used to fetch a copy of the previous instruction and/or its referenced data (step 514). Since the instruction would have been fetched when it was executed immediately before the invocation of the single-step trap handler, the retrieval of the instruction and/or its referenced data should not cause a page fault interrupt because the page that contains the instruction should presently reside in memory. Moreover, depending on the architecture of the processor, a copy of the instruction and/or its reference data may reside in an on-chip cache, thereby allowing the copy of the instruction and/or its referenced data to be retrieved very quickly. The retrieved copy of the previous instruction and/or its referenced data is then written to the trace output buffer (step 516), and the process is complete.

Depending on the operating system and the tracing requirements, the software should be able to handle context switches. One approach for handling context switches is to have a table for each thread that contains any necessary information that may be required by the tracing software, i.e., an instruction pointer is saved for each thread. The tracing software can identify individual threads through process IDs or thread IDs that can be obtained via the operating system.

Hence, the process shown in FIG. 5B can be re-described in the context of multiple threads, and this process is performed with respect to a particular thread. In other words, the process begins by retrieving a previously saved instruction address for the particular thread (step 510), which was saved during a previous invocation of the single-step trap handler for that particular thread; a flag may be set/reset to indicate when the single-step trap handler is being invoked for the first time for the thread. The current instruction address is then saved in an appropriate memory location, e.g., in a table for the thread (step 512). The previously saved instruction address for that particular thread is then used to fetch a copy of the previously executed instruction for the thread (step 514).

With reference now to FIG. 5C, a block diagram depicts an instruction pointer containing an address that references a first instruction and then subsequently references a second instruction, wherein the instructions have variable lengths. At some point in time, a single-step trap handler, which was previously configured or set up by a tracing program, receives execution control. At that point in time, instruction pointer 520 points to instruction 521 as the next instruction in a series of instructions 521-525. After the single-step trap has been handled, instruction 521 is executed. The single-step trap is processed again, and at that point in time, instruction pointer 520 points to instruction 522. As is apparent in the example, the instructions may have varying lengths.

With reference now to FIG. 5D, a flowchart depicts a methodology for delaying an instruction fetch during single-step trap processing for variable length instructions in accordance with the present invention. The process depicted in FIG. 5D is similar to the process depicted in FIG. 5B, but in FIG. 5D, the hardware architecture processes instructions that have variable length.

The process begins by retrieving a previously saved instruction address (step 530), which was saved during the previous invocation of the single-step trap handler; a flag may be set/reset to indicate when the single-step trap handler is being invoked for the first time during a tracing session. The current instruction address is then saved in an appropriate memory location (step 532); the current instruction address, i.e., the address of the next instruction to be executed, resides in the instruction pointer.

The current instruction address and the previously saved instruction address are subtracted to get a difference that represents the length of the previous instruction (step 534). The previously saved instruction address and the computed length of the previous instruction are then used to fetch a copy of the previous instruction (step 536). As mentioned with respect to FIG. 5B, since the instruction would have been fetched when it was executed immediately before the invocation of the single-step trap handler, the retrieval of the instruction should not cause a page fault interrupt because the page that contains the instruction should presently reside in memory. Moreover, depending on the architecture of the processor, a copy of the instruction may reside in an on-chip cache, thereby allowing the copy of the instruction to be retrieved very quickly. The retrieved copy of the previous instruction is then written to the trace output buffer (step 538), and the process is complete.

FIGS. 5A-5D depict processes that may be used while servicing a single-step trap or some other type of trap or interrupt. In contrast, the methodology that is depicted in FIG. 5E-5F is applied while servicing a taken-branch trap, branch-enable trap, or some other type of trap associated with a branch-like or jump-like instruction.

Figures 5E, 5F:
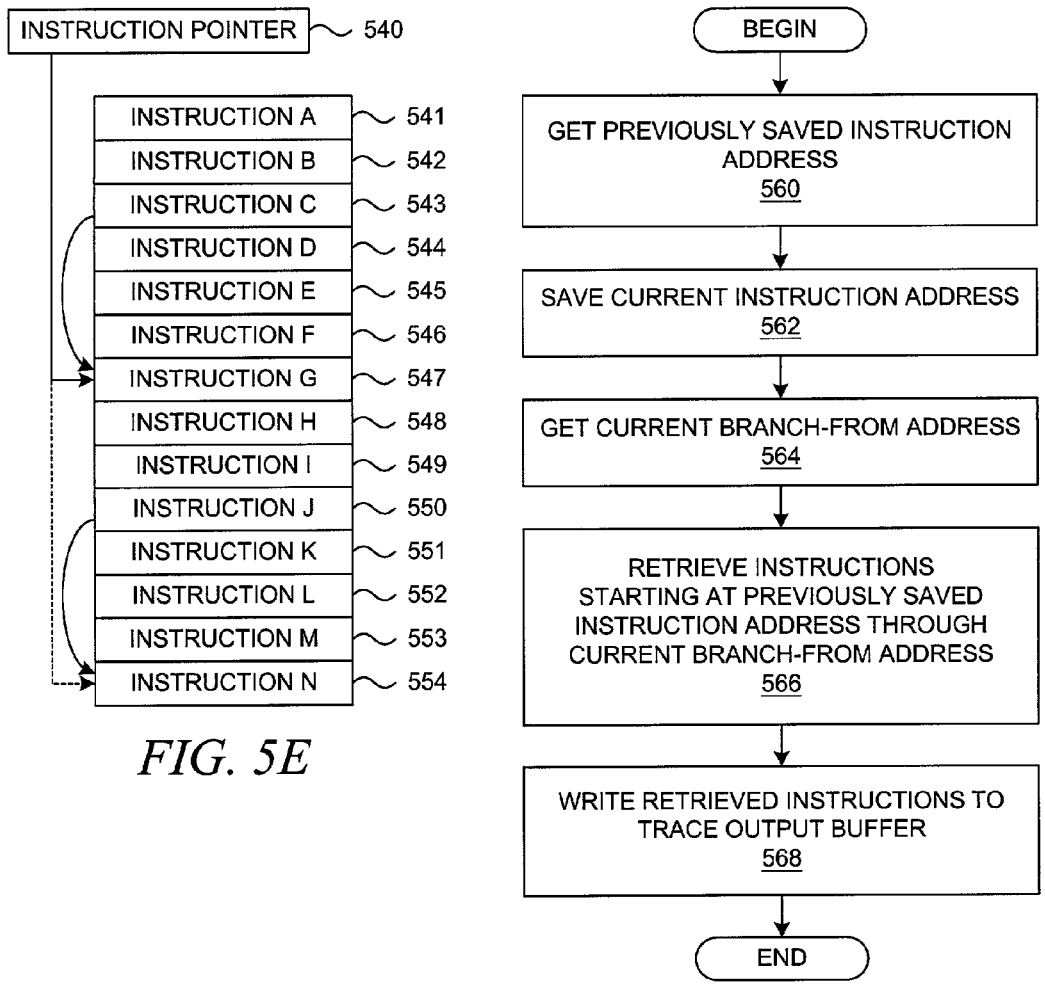
FIG. 5E depicts an instruction pointer containing an address that references a set of instructions, wherein the execution flow includes a branch between instructions.
FIG. 5F depicts a methodology for delaying an instruction fetch during taken-branch trap handling.

With reference now to FIG. 5E, a block diagram depicts an instruction pointer containing an address that references a set of instructions, wherein the execution flow includes a branch between instructions. At some point in time, a taken-branch trap handler receives execution control; the taken-branch trap handler would have been configured or set up by the tracing program at some earlier point in time. When the taken-branch trap occurs, instruction pointer 540 points to instruction 547 as the next instruction in a series of instructions 541-554. In other words, the previous instruction that has just been executed was a branch-like instruction. For simplicity of explanation, the tracing of previous instructions is ignored.

After the taken-branch trap has been handled, instruction 547 is executed, after which instructions 548-550 are executed. When the processor recognizes that instruction 550 is a branch-like or jump-like instruction during its execution, the taken-branch trap occurs again, after which instruction pointer 540 points to instruction 554. The tracing program then attempts to capture instructions 547-550 as trace output.

With reference now to FIG. 5F, a flowchart depicts a methodology for delaying an instruction fetch during taken-branch trap handling in accordance with the present invention. The process depicted in FIG. 5F is similar to the process depicted in FIG. 5B or FIG. 5D, but in FIG. 5F, taken-branch traps are being processed rather than single-step traps.

The process begins by retrieving a previously saved instruction address (step 560), which was saved during the previous invocation of the taken-branch trap handler; a flag may be set/reset to indicate when the taken-branch trap handler is being invoked for the first time during a tracing session. The current instruction address is then saved in an appropriate memory location (step 562); the current instruction address, i.e., the address of the next instruction to be executed, resides in the instruction pointer.

The process continues by getting the current branch-from address (step 564). When a branch-like instruction is executed, the processor must know the target address to which execution flow is proceeding. When the branch-like instruction is completed, the address of the instruction that caused the branch operation, i.e., branch-from instruction, must also be known within the processor, and it is assumed that the tracing program or taken-branch trap handler has access to the branch-from address. For example, after a taken-branch trap in the Intel® IA-64 processor architecture, the IIPA (Interrupt Instruction Previous Address), which is one of the interruption control registers, points to the trapping branch instruction, i.e., the current branch-from address; the IIP (Interruption Instruction Pointer) points to the branch target instruction, i.e., the current instruction address.

The process then retrieves copies of previously executed instructions starting at the previously saved instruction address and continuing through the current branch-from address (step 566), which would be similar to instructions 547-550 shown in FIG. 5E. As mentioned with respect to FIG. 5B, since the instructions would have been fetched when they were executed immediately before the invocation of the taken-branch trap handler, the retrieval of the instructions should not cause a page fault interrupt because the page (or pages) that contains the instructions should presently reside in memory. Moreover, depending on the architecture of the processor, copies of the instructions may reside in an on-chip cache, thereby allowing copies of the instructions to be retrieved very quickly. The retrieved copies of the instructions are then written to the trace output buffer (step 568), and the process is complete.

The advantages of the present invention should be apparent in view of the detailed description of the invention that is provided above. The present invention is a set of related methodologies to be used within instruction tracing software, such as a tracing program, to reduce its tendency to generate interrupts that cause unwanted interrupts, thereby generating unwanted trace output information. In a first methodology, the present invention recognizes that some memory blocks may be protected from access, such as read operations to obtain copies of instructions; the present invention presents a solution to obtain access to these memory blocks.

In a second methodology, the present invention recognizes that accesses to the trace output buffer may cause interrupts; the present invention presents a solution in which the trace output buffer is accessed via physical memory addressing. In a third methodology, the present invention recognizes that retrieving a copy of an instruction may cause unwanted interrupts; the present invention presents a methodology in which only the instruction address is traced, and the instruction address is resolved later during a post-processing phase of operation. In a fourth methodology, the present invention recognizes that an instruction can be traced after it has executed rather than before; the present invention present multiple different methods for obtaining instructions that have already executed.

These methodologies may be combined in different ways to obtain the benefits of more than one methodology. In addition, trace records should be generated to identify code that is generated. In the case of Java code, the JVMPI interface may be used to generate information regarding generated code, which includes the name of the code, the start address, and its length. An appropriately programmed profiler receives this information and may cause the code to be written to the trace buffer. In the case of generated code, the segments are typically marked as with read, write, and execute permissions, thereby allowing the code to be copied without generating an interrupt.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include recordable-type media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for reducing interrupts while tracing an application in a data processing system, the method comprising:
   receiving at a tracing function an indication that at least a portion of executable code from an application has been loaded into a memory block prior to execution of the portion of executable code; and
   altering by the tracing function at least one operating-system-defined memory access protection parameter to allow read access to the memory block, and wherein the receiving step and the altering step are performed for each memory fault for the application.

2. The method of claim 1 wherein a memory fault includes a page fault or a segment fault.

* * * * *